United States Patent
Park et al.

(10) Patent No.: US 7,656,848 B2
(45) Date of Patent: Feb. 2, 2010

(54) ROUTING SYSTEM AND METHOD IN SCATTERNET

(75) Inventors: Jong-hun Park, Suwon-si (KR); Yong Liu, New York, NY (US); Myung-jong Lee, New York, NY (US)

(73) Assignees: Samsung Electronics Co., Ltd., Suwon-si (KR); City University of New York, New York, NY (US)

( * ) Notice: Subject to any disclaimer, the term of this patent is extended or adjusted under 35 U.S.C. 154(b) by 936 days.

(21) Appl. No.: 10/888,024

(22) Filed: Jul. 12, 2004

(65) Prior Publication Data
US 2005/0007985 A1    Jan. 13, 2005

Related U.S. Application Data

(60) Provisional application No. 60/486,186, filed on Jul. 11, 2003.

(30) Foreign Application Priority Data

Apr. 12, 2004  (KR) .................. 10-2004-0024954

(51) Int. Cl.
    *H04J 3/24*    (2006.01)
(52) U.S. Cl. ...................... 370/338; 370/349

(58) Field of Classification Search ............ 455/41, 455/554.1, 554.2, 426.1, 426.2, 436; 370/338, 370/352–356, 389
See application file for complete search history.

(56) References Cited

U.S. PATENT DOCUMENTS

| 6,744,753 | B2 * | 6/2004 | Heinonen et al. ........... 370/338 |
| 6,775,258 | B1 * | 8/2004 | van Valkenburg et al. ... 370/338 |
| 6,901,057 | B2 * | 5/2005 | Rune et al. .................. 370/310 |
| 2004/0087274 | A1 * | 5/2004 | Ekberg et al. .............. 455/41.2 |

* cited by examiner

*Primary Examiner*—Sam Bhattacharya
(74) *Attorney, Agent, or Firm*—Sughrue Mion, PLLC

(57) ABSTRACT

A routing requesting method to transmit data to a device of a different piconets in a scatternet including at least two piconets which have a master device and at least one slave device controlled by the master device. A source device generates as a single packet an information inquiring a first radio resource used in each device of the piconet and an information requesting the routing. The source device broadcasts the packet to adjacent devices. The adjacent device, which receives the generated packet, sends the packet to a destination device by repeating the above process. The destination device assigns itself the master device, generates a RREP message including a clock information, and sends the generated RREP message to an adjacent device. The source device becomes aware of devices along the route using the information contained in the RREP message.

20 Claims, 6 Drawing Sheets

PACKET TRANSMISSION BEFORE THE PICONET SYNCHRONICATION

PACKET TRANSMISSION AFTER THE PICONET SYNCHRONICATION

FIG. 7A
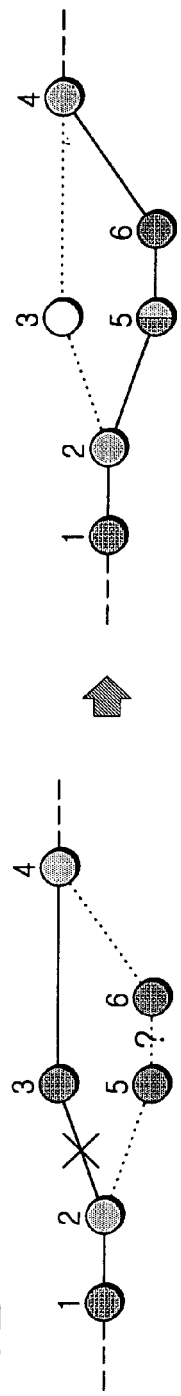
FIG. 7B
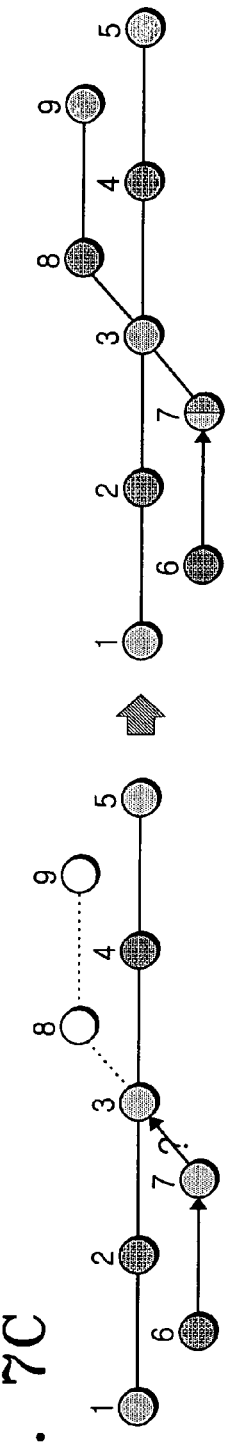
FIG. 7C
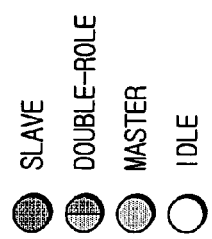
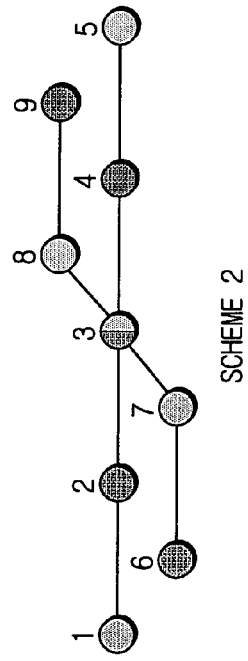

ROUTING SYSTEM AND METHOD IN SCATTERNET

CROSS-REFERENCE TO RELATED APPLICATIONS

This application claims the benefit of U.S. Provisional Application No. 60/486,186, filed on Jul. 11, 2003, in the United States Patent and Trademark Office, the disclosure of which is incorporated herein by reference in its entirety.

BACKGROUND OF THE INVENTION

1. Field of the Invention

Apparatuses and methods consistent with the present invention are generally directed to Bluetooth, and more specifically, to a routing system and method for transmitting data between devices forming a Bluetooth network.

2. Description of the Related Art

With the advent of various telecommunication devices such as personal computers (PCs), mobile phones, and personal digital assistances (PDAs), interconnections are needed for telecommunication devices and new technologies have been proposed for data communications. Bluetooth, whose promoters include ERICSSON (Sweden), IBM and INTEL (U.S.A), NOKIA (Finland), and TOSHIBA (Japan), is featured to implement short-range data communications of telecommunication devices using radio waves, which was previously implemented using (wired) cable connection or infrared transmission.

Bluetooth uses a high radio frequency of 2.4 GHz to enable communications over obstacles, provides a data transfer rate of 1~10 Mbps, and covers a transfer distance of 10~100 m, which is superior to the Infrared Data Association (IrDA) standard. In addition, Bluetooth consumes lower amounts of power while performing high data rate transmission and ensures security for the data transmission.

FIG. 1 illustrates a conventional Bluetooth system. In general, the Bluetooth system provides a point-to-point connection or a point-to-multipoint connection. In the point-to-multipoint connection, a plurality of Bluetooth devices shares a same channel. At least two of the Bluetooth devices sharing the same channel, form a piconet. One Bluetooth device, which initiates communication in the piconet, operates as a master, and the other Bluetooth devices operate as slaves. The master controls channel access of the slaves. A plurality of piconets having at least one overlapping service area, form a scatternet. A master device in a certain piconet may operate as a slave in another piconet. FIG. 1 illustrates a construction of the scatternet.

Referring to FIG. 1, thee piconets A, B, and C form a scatternet. A master of each piconet A, B, and C is a first device 100, a first device 110, and a first device 120, respectively. The first device 100, which is the master of the piconet A, also operates as a slave of the piconet B. This double-role property enables extension of communications into other piconets, which was limited in the conventional piconet. The master 100 of the piconet A is connected with the master 110 of the piconet B, and the slave 116 of the piconet B is connected with the master 120 of the piconet C. A routing process is described below for transferring data from a device of the piconet A to a device of the piconet C.

In general, the route for transferring data between devices of different piconets includes four processes, that is, an inquiry process, a page process, a routing request process, and a routing response process, which are described in detail below.

The inquiry process is to recognize addresses of unknown neighbor devices when a device of a piconet attempts to connect to any other device. The piconet device inquires about the information and address of radio resource used for other devices. The inquired devices send to the inquirer device the information and address of its radio resource. FIG. 2 illustrates packet transmission at the inquiry process. To perform the inquiry process, a transmitter device broadcasts packets to other devices at a certain interval. Specifically, the transmitter device sends the packets in a packet transmit period (TX) and receives a response for the transmitted packets in a packet receive period (RX). The TX and the RX generally have the same size and alternate with each other. The TX is 625 bits long, of which two 68 bits are used by the transmitter device to broadcast its information to other devices as shown in FIG. 2. The transmitter device broadcasts the packets using the usable radio resource to probe a radio resource used by other devices (receiver devices).

The page process is to set a master among the devices of the piconet. The master is a specific device among the piconet devices sharing the information and address of the radio resource through the inquiry process. The master pages the piconet devices one by one. Through the page process, the piconet devices are divided into a master and a slave.

The routing request process is to request a route from a source device to a destination device. The source device generates and broadcasts a route request (RREQ) message to adjacent devices. The RREQ-received device compares its address information with that of the destination device embedded in the RREQ message. If the two address information are different, the RREQ-received device updates and broadcasts the RREQ message to the adjacent devices. If the two address information are the same, the RREQ-received device recognizes that it is the device to which the source device attempts to transmit data. The data transmissions between the devices of one piconet generally need not follow the above processes since the master knows all the address information of the slaves in the piconet. That is, the slave can route to another slave through the master.

The routing response process is to transmit a response for the routing request from the destination device to the source device. Through the routing response process, the route is established between the source device and the destination device for data transmission. The destination generates and sends a route reply (RREP) message to the source device using the route of the RREQ message.

In light of the foregoing, all the devices of the piconet or the scatternet are involved with the routing from the source device to the destination device for data transmission. The routing time is delayed due to the inquiry and page processes. Conventionally, the inquiry process takes 10.24 seconds, and the page process with respect to one device takes 0.64 seconds. Accordingly, the inquiry and page processes take 14.72 seconds in the piconet including one master and seven slaves.

FIG. 3 illustrates a packet transmission process from the source device to the destination device, in which a route is positioned wherein masters and slaves are disposed in an alternating manner. It is assumed that a source device and a first device form a piconet A, and the first device and a second device form a piconet B.

Upon receiving packets from the source device of the piconet A, the first device needs to change to a radio resource used in the piconet B in order to transmit the packets to the second device. After changing to the radio resource of the piconet B, the first device transmits the packets to the second device. As shown in FIG. 3, a time slot of the piconet A and that of the piconet B are assigned differently from each other. Hence, the first device uses the time slot of the piconet A to receive the packets from the source node, and uses that of the piconet B to transmit the packets to the second device. That is, the first device cannot transmit the packets, which are received from the source device, to the second device immediately afterwards, but transmits the packets with delay for a certain amount of time.

SUMMARY OF THE INVENTION

To address the above shortcomings of the related arrangement, an exemplary aspect of the present invention is to provide a system and a method capable of reducing a time for routing requested by a source device.

Another exemplary aspect of the present invention is to provide a system and a method capable of reducing a time for transmitting data from a source device to a destination device.

Still another exemplary aspect of the present invention is to provide a system and a method capable of uniformly maintaining a power consumed by devices of a scatternet.

Yet another exemplary aspect of the present invention is to provide a system and a method capable of minimizing the number of devices related with a route establishment.

To achieve the above aspects and features of the present invention, in a scatternet including at least two piconets which have a master device and at least one slave device controlled by the master device, a routing request method to transmit data to a device of a different piconet includes generating as a single packet, an information inquiring a first radio resource used in each device of the piconet and an information requesting the route, and broadcasting the packet to adjacent devices.

In a scatternet including at least two piconets which have a master device and at least one slave device controlled by the master device, a routing response method to reply for a routing request from a device of a different piconet includes assigning the master device to a device which receives the routing request, and generating a route reply (RREP) message including a clock information, and sending the generated RREP message to an adjacent device.

In a scatternet including at least two piconets which have a master device and at least one slave device controlled by the master device, a routing system for requesting a route to transmit data to a device of a different piconet includes a source device generating as a single packet an information inquiring a first radio resource used in each device of the piconet and an information requesting the routing, and at least one adjacent device receiving the broadcast packet from the source device.

In a communication system in which a scatternet includes at least two piconets which have a master device and at least one slave device controlled by the master device, a routing system for responding to a routing request from a device of a different piconet includes a destination device assigning the master device to a device which receives the routing request, and generating a route reply (RREP) message including a clock information, and an adjacent device receiving the generated RREP message from the destination device.

BRIEF DESCRIPTION OF THE FIGURES

These and/or other aspects and advantages of the invention will become apparent and more readily appreciated from the following description of the embodiments, taken in conjunction with the accompanying drawing figures of which:

FIGS. 7A, 7B, and 7C are diagrams illustrating a re-routing process according to an embodiment of the present invention.

DETAILED DESCRIPTION OF THE EMBODIMENTS

Figure 1:
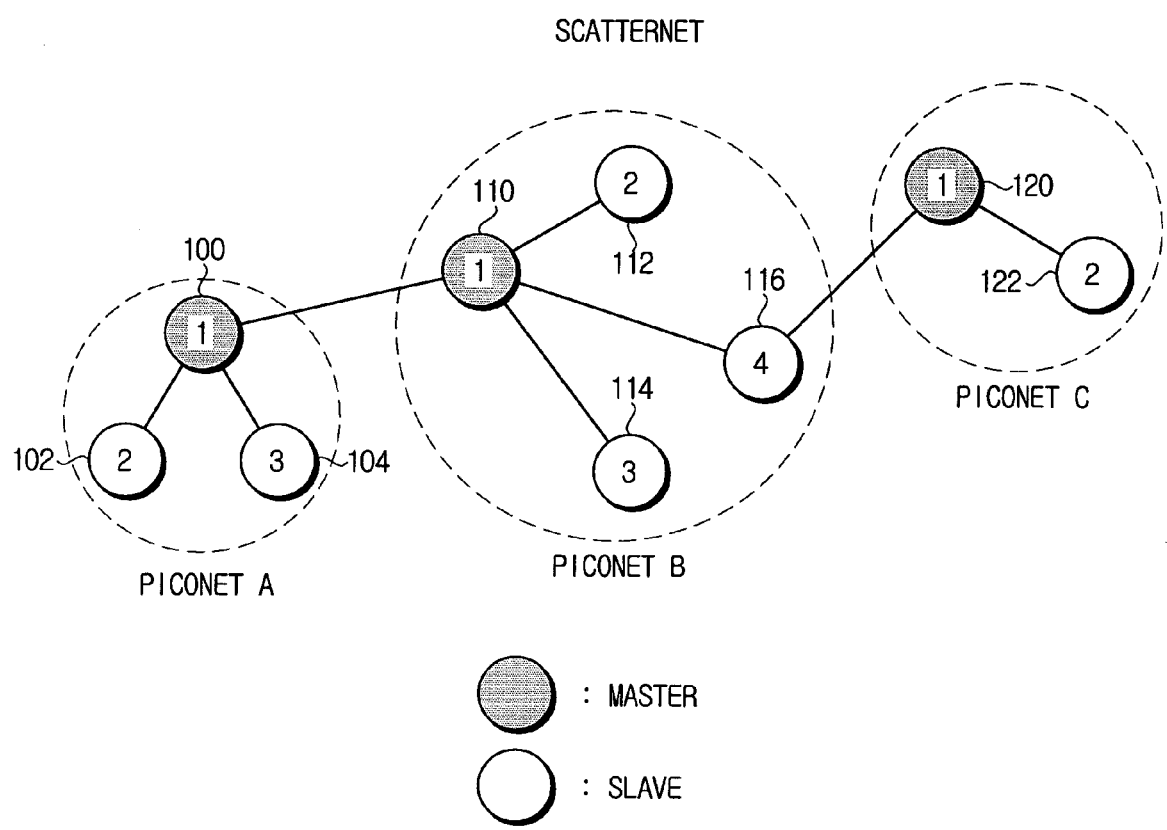
FIG. 1 is a diagram illustrating a construction of a conventional scatternet.

Reference will now be made in detail to the embodiments of the present invention, examples of which are illustrated in the accompanying drawing figures, wherein like reference numerals refer to the like elements throughout. The embodiments are described below in order to explain the present invention by referring to the drawing figures.

In an embodiment of the present invention, a transmitter denotes a device which transmits packets for performing an inquiry process and an routing request process, and a receiver denotes a device which receives the packets.

Figure 2:
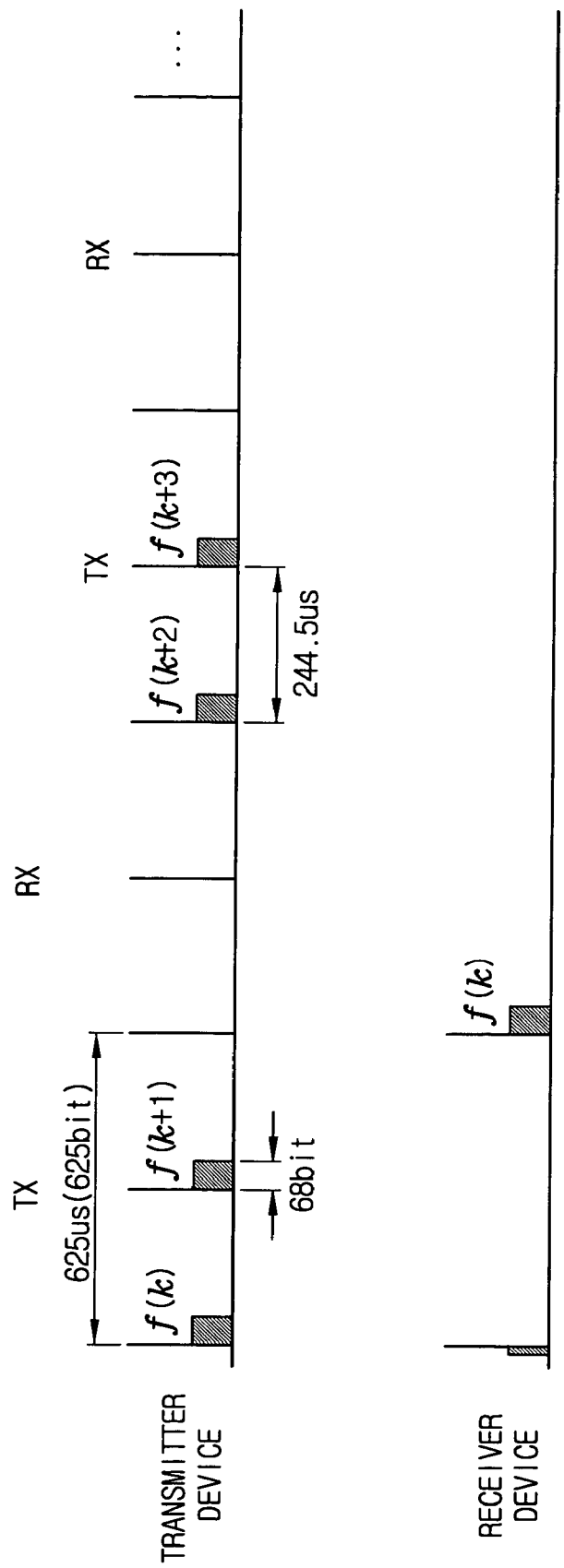
FIG. 2 is a diagram illustrating a packet transmit process of a transmitter device and a packet receive process of a receiver device.
Figure 4:
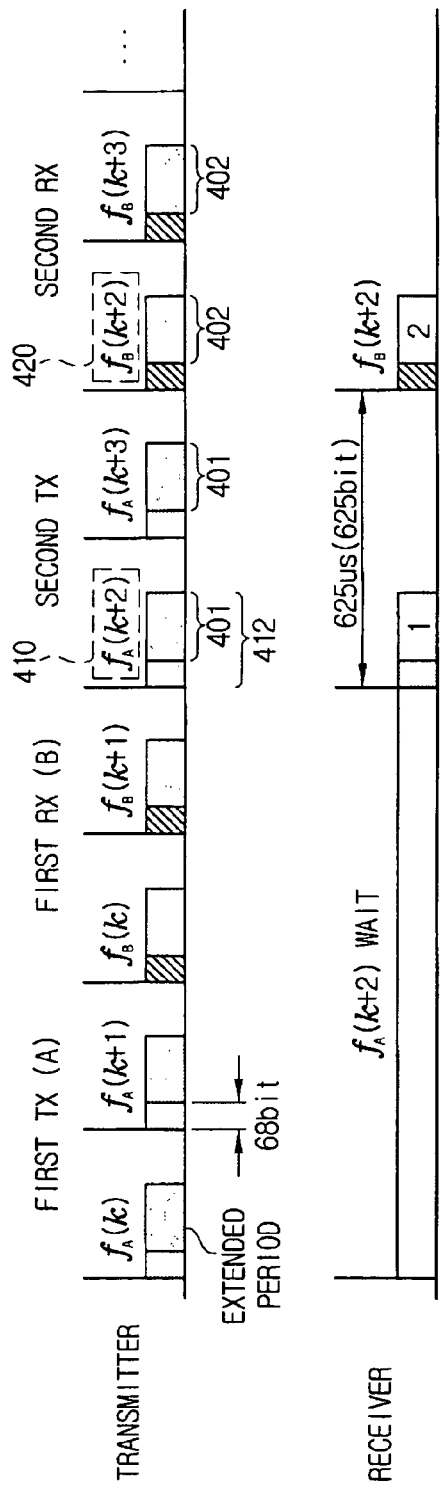
FIG. 4 is a diagram illustrating a packet transmit process and a packet receive process of a receiver.

FIG. 4 illustrates packet transmission capable of performing an inquiry process and a routing request process as a single process using certain periods which are not used in FIG. 2. Referring back to FIG. 2, only 136 bits of 625 bits are used and the other 489 bits are not used. According to an embodiment of the present invention, the unused 489 bits are utilized. Referring now to FIG. 4, 289 bits of the 489 bits are divided into two periods. The number of the used bits may be determined by a user. For example, provided that 200 μs is required to modulate a radio frequency twice, the number of bits capable of transmitting an inquiry packet can be increased up to 144 bits even after excluding the time required for the frequency modulation in a single transmit period (TX). A period used in an embodiment of the present invention is referred to as an extended period. A transmitter sends a route request RREQ message using the extended period. The RREQ message contains an address of a source device, an address of a destination device, an address of a device transmitting the RREQ message (address of an upstream device), a clock information of the RREQ-transmitting device, and a packet sequence number. A receiver receiving the RREQ message generates a route reply RREP message using the upstream device address and sends the generated RREP message to the transmitter (upstream device). Hence, with the packets constructed above, the inquiry and routing request processes are performed at the same time.

FIG. 4 also illustrates packet transmission in a packet receive period (RX). The transmitter performs the inquiry process using the TXs and RXs. The transmitter differently allots the radio resource used in the TX and that used in the RX, to thus prevent collisions between packets transmitted in the TX and RX. That is, the available radio resource is allotted to at least two groups. In general, the radio resource is allotted to different groups to prevent the collisions of the radio resource. Referring back to FIG. 4, the radio resource is allotted to two groups A and B.

The transmitter sends packets in the TX using the radio resource allotted to the group A, and in the RX using the radio resource allotted to the group B. If the packets are transmitted using the radio resource of the group A, adjacent devices also reply using the radio resource of the group A. That is, the receiver sends the packets in the RX using the radio resource of the group B, and waits to receive the radio resource of the group A.

Still referring to FIG. 4, the RREQ message is transmitted using two packets since a single packet is not enough to transmit the RREQ message as aforementioned. One RREQ message is split into a first type 401 and a second type 402. The transmitter transmits the first type 401 in the TX of the transmitter two times and the second type 402 in the RX of the transmitter two times.

The receiver waits to receive the packets from the transmitter. By way of example, it is assumed that the receiver waits to receive the packets 412 which use the radio resource of $f_A(k+2)$ 410. As the transmitter sends the packets 412 in the second TX using the radio resource of $f_A(k+2)$ 410, the receiver can receive the packets 412 in the second TX of the transmitter. The receiver receives a part of the RREQ message (the first type 401). Then, the receiver needs to receive the rest of the RREQ message (the second type 402). Provided that the receiver knows an order of the radio resource used by the transmitter, the receiver becomes aware of the radio resource to be used by the transmitter in the second RX of the transmitter. By changing to the radio resource to $f_B(k+2)$ 420 to be used by the transmitter in the second RX, the receiver receives the rest of the RREQ message. It will be appreciated that the RREQ message is transmitted and received by iterating only one type when all information of the RREQ message can be transmitted by only one packet.

In general, since the number of the available radio resource at the inquiry process is 32, the inquiry process is performed using eight TXs and eight RXs. Packets are transmitted using two radio resources in a single RX (TX).

While performing the inquiry process, the adjacent device performs the routing request process at the same time. If the address of the destination device contained in the RREQ message is different from its address, the adjacent device broadcasts the updated packet to adjacent devices in the same manner as shown in FIG. 4. If the address of the destination device contained in the RREQ message is the same as its address, the adjacent device recognizes that it is the device to which the route is requested by the source device. As a result, the RREQ message is transmitted from the source device to the destination device.

Figure 5:
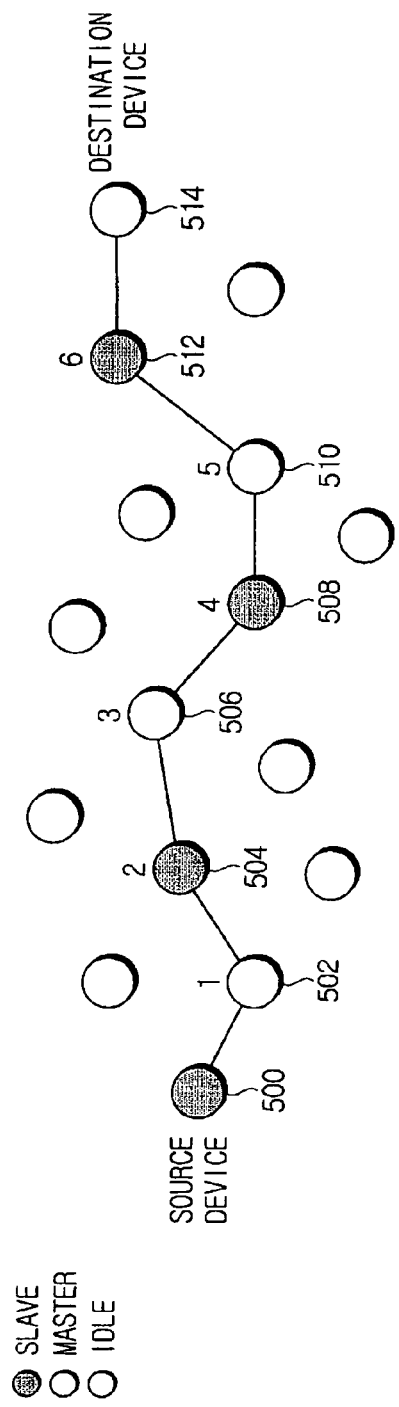
FIG. 5 is a diagram illustrating devices along a route, which are assigned a role of a master or a slave according to an embodiment of the present invention.

A page process and a routing response process are described below. According to an embodiment of the present invention, the destination device is assigned the master role. Referring to FIG. 5, devices perform the page process and the routing response process. The destination device 514 assigns itself as the master. The destination device 514 sends the RREP message to the sixth device 512. The RREP message includes a master/slave role information, an address information, and a clock information. The master/slave role information contains information indicating whether to assign a device receiving the RREP message as the master or as the slave. According to an embodiment of the present invention, the devices along the route are assigned as a master and as a slave in an alternating manner. Hence, the destination device 514, which assigns itself as the master, assigns the sixth device 512 as the slave. The clock information contains information on a clock used in the destination device 514 so that the page process is simultaneously performed with the transmission and reception of the RREP message.

Upon receiving the RREP message, the sixth device 512 assigns itself as the slave based on the information contained in the received RREP message. The sixth device 512 sends the RREP message to the fifth device 510. The fifth device 510 assigns itself as the master based on the information contained in the received RREP message. The fourth device 508 calculates a clock difference using its clock and the clock information of the master contained in the RREP message. By compensating a value corresponding to the clock difference, the fifth device 510 can transmit the received data to the sixth device 512 immediately after all the data is received. A route is established from the source device to the destination device performing the above processes, which is described below with reference to FIG. 6.

As aforementioned, the route devices starting from the destination device are alternatingly assigned as a master or as a slave according to a hop count with respect to the destination device. Thus, power consumed by the scatternet devices is uniform. A certain device having only one role as a master, is apt to consume more power. Meanwhile, according to an embodiment of the present invention, certain devices operate as the master or the slave according to circumstances, thus reducing the power consumption.

Figure 3:
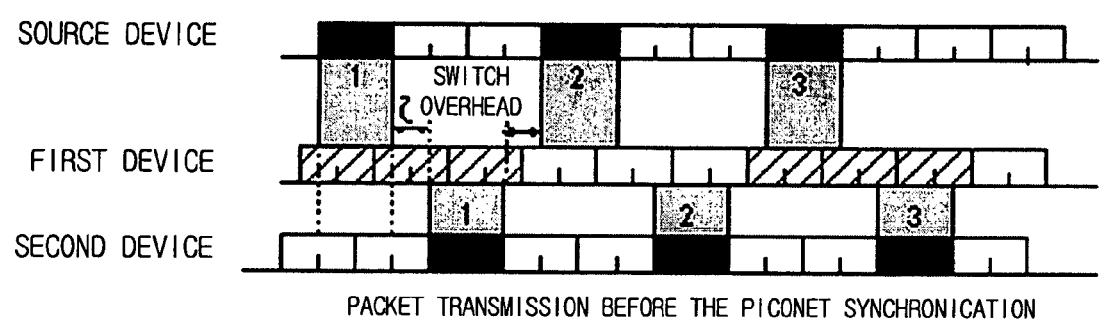
FIG. 3 is a diagram illustrating a delay of data transmission due to a clock difference of the transmitter and receiver devices.
Figure 6:
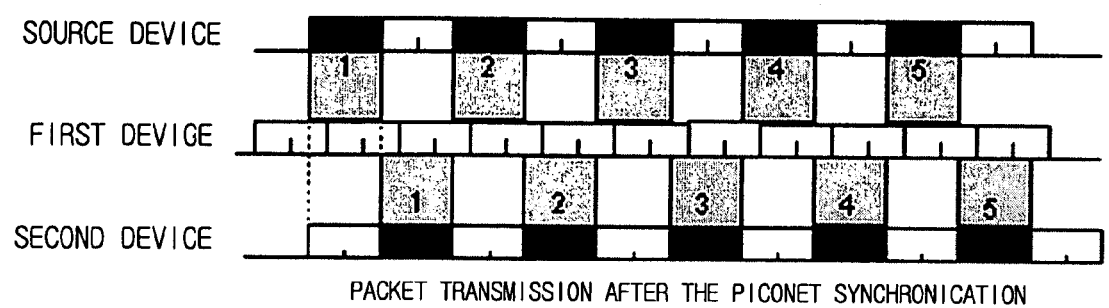
FIG. 6 is a diagram illustrating the delay-free data transmission of the transmitter and receiver according to an embodiment of the present invention.

FIG. 6 illustrates a data transmission process from a source device to a destination device according to an embodiment of the present invention, in which the data is transmitted from the source device to a second device by way of example. The source device knows the clock information used in the second device. The clock information of the second device is a compensated information to acquire the clock information of the destination device and the synchronization. Accordingly, the master along the route directly or indirectly knows the clock of the destination device. The source device transmits data to the first device using the clock of the second device. The first device transmits the received data to the second device. Consequently, the data is transmitted from the source device to the destination device immediately afterwards. Referring back to FIG. 3, if the clocks of the masters are different from each other, each master delays the transmission of the received data for a certain time and transmits the data to a next device so as to synchronize the clock. This shortcoming is addressed by the synchronization using the clock information used in each master through the routing response process.

FIGS. 7A, 7B, and 7C illustrate exemplary processes for reestablishing a new route in lieu of a set route according to an embodiment of the present invention, which is described in detail below.

FIG. 7A illustrates a new route establishment using the seventh device and the eighth device in lieu of a set route along the first device, the second device, the third device, the fourth device, the fifth device, and the sixth device, in which a hop count of the re-established route is less than that of the existing route. The existing route is established from the second device to the sixth device via three devices. Meanwhile, the re-established route is established from the second device to the sixth device via two devices.

Still referring to FIG. 7A, the master and slave roles of the existing route devices are maintained. Accordingly, the second device and the sixth device, to maintain the slave role, has to appropriately assign the master and the slave roles to the devices along the re-established route. Specifically, the seventh device operates as both the master and the slave, and the eighth device operates as the slave. The seventh device operates as the master with respect to the second device, and as the slave with respect to the eighth device.

Referring to FIG. 7B, a connection failure has occurred between the second device and the third device along the existing route so that a new route is re-established using other devices, that is, the fifth device and the sixth device. The routing process using the fifth device and the sixth devices is the same as in FIG. 7A.

Referring to FIG. 7C, a route is established using a device along the existing route. The existing route is along the first device, the second device, the third device, the fourth device, and the fifth device. A new route is established using the third device. The role of the third device is of the master along the existing route, but has to be the slave along the new route. Hence, the third device operates as the master when transmitting data along the existing route and as the slave when transmitting data along the new route. Alternatively, the third device may operate only as the master by assigning the seventh device the master and slave role.

According to an embodiment of the present invention, only two processes are used to route from the source device to the destination device so as to reduce routing the time. In addition, the device along the route is assigned the master or the slave depending on the hop count from the destination device so that the scatternet devices consume uniform power.

While the embodiments of the present invention have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the invention.

What is claimed is:

1. A routing request method of a scatternet including at least a first piconet and a second piconet, to transmit data to a device of the second piconet, each of the first and second piconets having a master device and at least one slave device controlled by the master device, comprising:
generating a single packet having information inquiring about a first radio resource used in each of a plurality of devices of the first piconet and an information requesting a route, as a generated packet; and
broadcasting the generated packet to adjacent devices of the plurality of devices,
wherein a master device of one piconet in the scatternet is capable of acting as a slave device of the other piconet in the scatternet.

2. The routing method of claim 1, wherein the first radio resource comprises an address information and a clock information.

3. The routing method of claim 1, wherein the generated packet is broadcast by splitting a second radio resource into at least two groups as split groups to prevent an inter-group collision and alternatingly using the split groups of the second radio resource.

4. The routing method of claim 3, wherein the second radio resource comprises a frequency.

5. The routing method of claim 4, wherein, if a size of the generated packet exceeds a transmission unit, the generated packet is split into split packets broadcast using the at least two groups of the second radio resource.

6. The routing method of claim 3, wherein, if a size of a packet transmit period is at least two times as long as a size of the generated packet, the generated packet is re-transmitted in a predetermined order using the at least two groups of the second radio resource.

7. A routing response method of a scatternet including at least a first piconet and a second piconet, to reply to a routing request from a first device of the first piconet, each of the first and the second piconets having a master device and at least one slave device controlled by the master device, comprising:
assigning a second device receiving the routing request as a first master device or as a first slave device, and generating a route reply (RREP) message as a generated RREP including a clock information; and
sending the generated RREP message to a first adjacent device adjacent to the second device,
wherein a master device of one piconet in the scatternet is capable of acting as a slave device of the other piconet in the scatternet.

8. The routing response method of claim 7, wherein the RREP message includes an information indicating an alternating assignment of devices receiving the RREP message as a slave device or as a master device.

9. The routing response method of claim 8, wherein the first adjacent device assigned as a second master device is synchronized by compensating a clock of the first adjacent device as a compensated clock using the clock information of the RREP message.

10. The routing response method of claim 9, wherein the clock information of the RREP is updated using the compensated clock as updated clock information, and the RREP message is sent to a second adjacent device adjacent to the first adjacent device, by including the updated clock information in the RREP message.

11. A routing system of a scatternet including at least a first piconet and a second piconet, for requesting a route to transmit data to a device of the second piconet, each of the first and second piconets having a master device and at least one slave device controlled by the master device, comprising:
a source device generating and broadcasting a single packet as a generated broadcast packet having an information inquiring about a first radio resource used in each of a plurality of devices of the first piconet and an information requesting a routing; and
at least one adjacent device receiving the broadcast packet from the source device,
wherein a master device of one piconet in the scatternet is capable of acting as a slave device of the other piconet in the scatternet.

12. The routing system of claim 11, wherein the first radio resource comprises an address information and a clock information.

13. The routing system of claim 11, wherein the source device splits a second radio resource into at least two groups as split groups to prevent an inter-group collision and broadcasts the broadcast packet alternatingly using the split groups of the second radio resource.

14. The routing system of claim of 13, wherein the second radio resource comprises a frequency.

15. The routing system of claim of 14, wherein, if a size of the generated broadcast packet exceeds a transmission unit, the source device splits the generated broadcast packet into split packets and broadcasts the split packets using the at least two groups of the second radio resource.

16. The routing system of claim of 13, wherein the source device re-transmits the generated broadcast packet in a predetermined order using the at least two groups of the second radio resource if a size of a packet transmit period is at least two times as long as a size of the generated broadcast packet.

17. A routing system of a scatternet including at least a first piconet and a second piconet, for responding to a routing request from a device of the first piconet in a communication system, each of the at least first and second piconets having a master device and at least one slave device controlled by the master device, comprising:
a destination device assigning a device receiving the routing request as a first master device or a first slave device, and generating a route reply (RREP) message as a generated RREP including a clock information; and a first adjacent device adjacent to the destination device receiving the generated RREP message from the destination device, wherein a master device of one piconet in the scatternet is capable of acting as a slave device of the other piconet in the scatternet.

18. The routing system of claim 17, wherein the RREP message includes an information indicating an alternating assignment of devices receiving the RREP message as a slave device or as a master device.

19. The routing system of claim 18, wherein the first adjacent device assigned as a second master is synchronized by compensating a clock of the first adjacent device as a compensated clock using the clock information of the RREP message.

20. The routing system of claim 19, wherein the first adjacent device assigned as the second master updates the clock information of the RREP using the compensated clock as updated clock information and sends the RREP message to a second adjacent device adjacent to the first adjacent device, by including the updated clock information in the RREP message.

* * * * *